Figure 1:
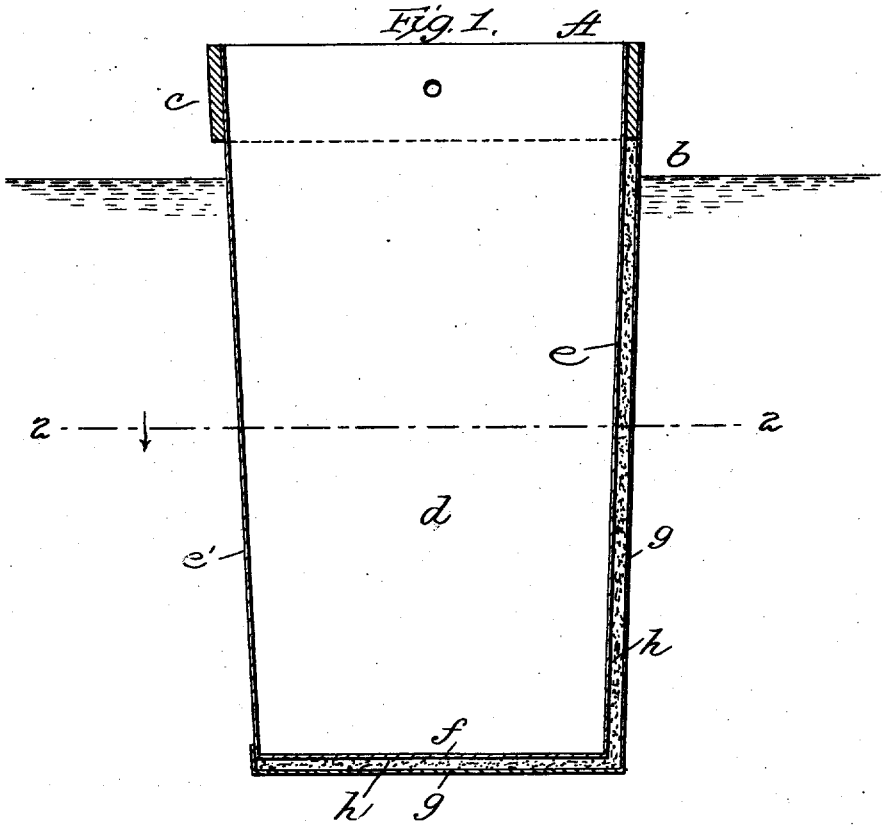

C. E. STRUCK.

ICE MAKING CAN OR VESSEL.

No. 11,406. Reissued Mar. 20, 1894.

Attest

Milton Middleton

F. L. Middleton

Inventor

Charles E. Struck by Ellis Spear

Atty

THE NATIONAL LITHOGRAPHING COMPANY,
WASHINGTON, D. C.

UNITED STATES PATENT OFFICE.

CHARLES E. STRUCK, OF NEW YORK, N. Y., ASSIGNOR, BY DIRECT AND MESNE ASSIGNMENTS, TO REUTER & MALLORY, OF BALTIMORE, MARYLAND.

ICE-MAKING CAN OR VESSEL.

SPECIFICATION forming part of Reissued Letters Patent No. 11,406, dated March 20, 1894.

Original No. 475,629, dated May 24, 1892. Application for reissue filed September 28, 1893. Serial No. 486,752.

*To all whom it may concern:*

Be it known that I, CHARLES E. STRUCK, of the city, county, and State of New York, have invented a new and useful Improvement in Ice-Making Cans or Vessels, of which the following is a full, clear, and exact description.

The invention relates to the making of ice artificially more particularly ice which is designed to be used, either directly or indirectly, internally, and which, therefore, should be as free from impurities as practicable; but it is equally applicable to making ice for all purposes—that is, whenever clear blocks or cakes of pure ice or what is known as "crystal ice" are required.

The various processes and mechanical means for artificially making ice are too numerous and well known to mention; nor is my invention restricted to any particular one, but applicable to any in which the water to be frozen is placed in cans or vessels and the heat abstracted by a fluid or gas reduced to a lower temperature outside of the cans—such, for instance, as brine — the congelation of which requires a lower temperature than that of plain water. In such apparatuses and processes the cans or vessels containing the water to be frozen are usually exposed over the whole of their outside surfaces to the brine or medium which absorbs the heat extracted from the water in the cans. Thus the freezing of the water in the cans takes place from opposite sides or opposite sides and bottom of the can simultaneously, which by the free air and impurities contained in the water and failure of some of the air to escape during the crystallization of the ice causes the central portion of the can to remain liquid till nearly the completion of the process thereby making what is termed a "core" of impure or soft ice to form in the center of the block of ice. This is very objectionable, especially where boiled or condensed water has been used to make the ice, as such water, while tending to make more solid ice, and possibly more rapidly, is apt to be tainted and the tainted matters collect about or in the core that, being in the center of the block and extending from and over the bottom and spreading over the top, holds the impurities in the block.

My invention has for its object freezing the water in the cans or vessels gradually and mainly or wholly from one side or portion of them or checking or delaying the refrigeration of the one side or portion of the water in the containing-vessel while the refrigeration of the other side or portion is advancing.

The invention consists in a can or vessel of novel construction for this purpose, substantially as hereinafter described, and more particularly pointed out in the claims, whereby the impurities contained in the water are prevented from becoming fixed in the main body of the ice and are driven over to the warmest surfaces or corners of the containing-vessels, and on removing the ice from the can or vessel said impurities may readily be removed, thereby leaving a block of pure or crystal ice.

It also has the advantage of retarding the freezing of the water in the can as compared with cans exposed to refrigeration on all sides alike, and it is a well-known fact that ice made less rapidly is usually more solid.

Reference is to be had to the accompanying drawings, forming a part of this specification, in which similar letters of reference indicate corresponding parts in both the figures.

Figure 2:
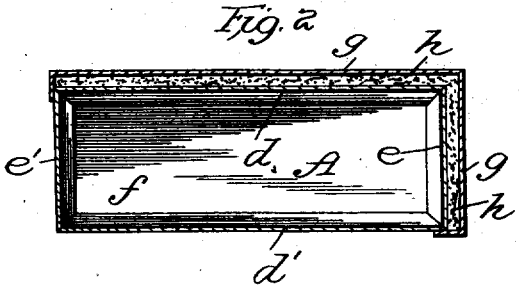

Figure 1, represents a vertical section of an ice-making can or vessel embodying my invention; and Fig. 2, is a horizontal section of the same on the line 2 2 in Fig. 1, looking downward.

A indicates the can, which in its general shape or construction does not or need not differ from the cans in ordinary use for making ice in blocks—such cans, for instance, as are used in ice-making apparatus employing a congealing liquid (such as brine) outside of the cans —*b* indicating the level of the brine in which the can is immersed or suspended. This can is of slightly-tapering form in direction of its length, as usual, to facilitate re-moval of the frozen block and is, represented as of parallelogrammatic form in transverse section, thereby presenting four sides. Around the upper part of the can is the usual strengthening band *c*, and said upper part is provided with the usual perforations to facilitate the suspension and withdrawal of the can. Said can is made with differential walls in respect to heat conductivity. Thus the can has certain of its adjacent sides or said sides and bottom made jacketed with double walls having a space in between said walls, which space is filled with any suitable non-conductor—that is, poor conductor of heat—the opposite sides of the can not being so jacketed or protected, but made single or of lesser thickness and of greater heat conductivity. Thus the sides *d e* and bottom *f* of the can have an outside jacket or jackets *g* applied to them, leaving a vacant space between such jacket and the exterior adjacent surface of the can, which space is filled with a suitable non-conductor *h*. The opposite sides *d′ e′* are not so jacketed or protected. By this construction of the can the freezing of the water in said vessel will take place or more rapidly from the unprotected sides *d′ e′*, instead of uniformly from all sides, as in the ordinary construction of can. This will cause the core or soft and impure ice to form or collect on the protected and warmer sides *d e* of the can and corners or angles of such sides, as also in a measure on the bottom, and the formation of the core up the center of the block is avoided, so that after the block of ice is removed from the can the soft or impure or tainted ice, usually termed the "core," will be wholly on or near the outside of the block, and may readily be removed or allowed to disappear by exposure of the block to the air, thereby leaving a block of solid crystal ice.

In some cases the bottom of the can need not be so jacketed and protected; but it is preferred to jacket and protect the bottom as well as certain of the adjacent sides, as described.

This particular construction is applicable to ordinary or old cans in use, as well as to new cans, by simply soldering on and making tight, as against leakage, the jackets to the surface required with the filling of non-conducting material within the jacket-spaces.

I am aware that a receptacle or vessel for making ice has had combined with and arranged within it a chamber having walls of insulating material and open at one or two of its sides to the interior of the ice-making receptacle for the purpose of restricting the freezing of the water to the portion of the receptacle the walls of which are not specially insulated, in order that an agitator may be worked in the insulated chamber for the purpose of agitating the water to be frozen in the other portion of the receptacle; but such is not the purpose of my ice-making can or vessel, which has no agitator within it, and is, pure and simple, a still-water receptacle and certain of the sides or walls of which are specially insulated throughout their whole water-surfaces, while the opposite sides and walls are not so insulated throughout their surfaces, and such receptacle has no separate non-freezing chamber within it, the whole operating in the manner and for the purpose hereinbefore described.

Having thus fully described my invention, I claim as new and desire to secure by Letters Patent—

1. As a new article of manufacture, an ice-making can or vessel having its bottom and two of its adjacent sides jacketed or insulated and its two remaining adjacent sides non-jacketed or non-insulated, as and for the purpose set forth.

2. As a new article of manufacture, an ice-making can or vessel consisting of a substantially rectangular can having its bottom and two of its adjacent sides jacketed or insulated throughout their whole areas of exposed surfaces and having its two remaining adjacent sides not jacketed or insulated throughout their exposed areas or surfaces, the areas of the jacketed sides equaling the areas of the opposite unjacketed sides, substantially as herein shown and described.

3. A refrigerating can having its sides of different heat conductivity and an unobstructed interior whereby the central line of refrigeration is thrown to one side of the can, substantially as described.

CHARLES E. STRUCK.

Witnesses:
S. B. GOODALE,
WILBER C. GOODALE.